June 7, 1949.  A. N. MILSTER  2,472,541
BRAKE TESTING DEVICE
Filed Dec. 16, 1944
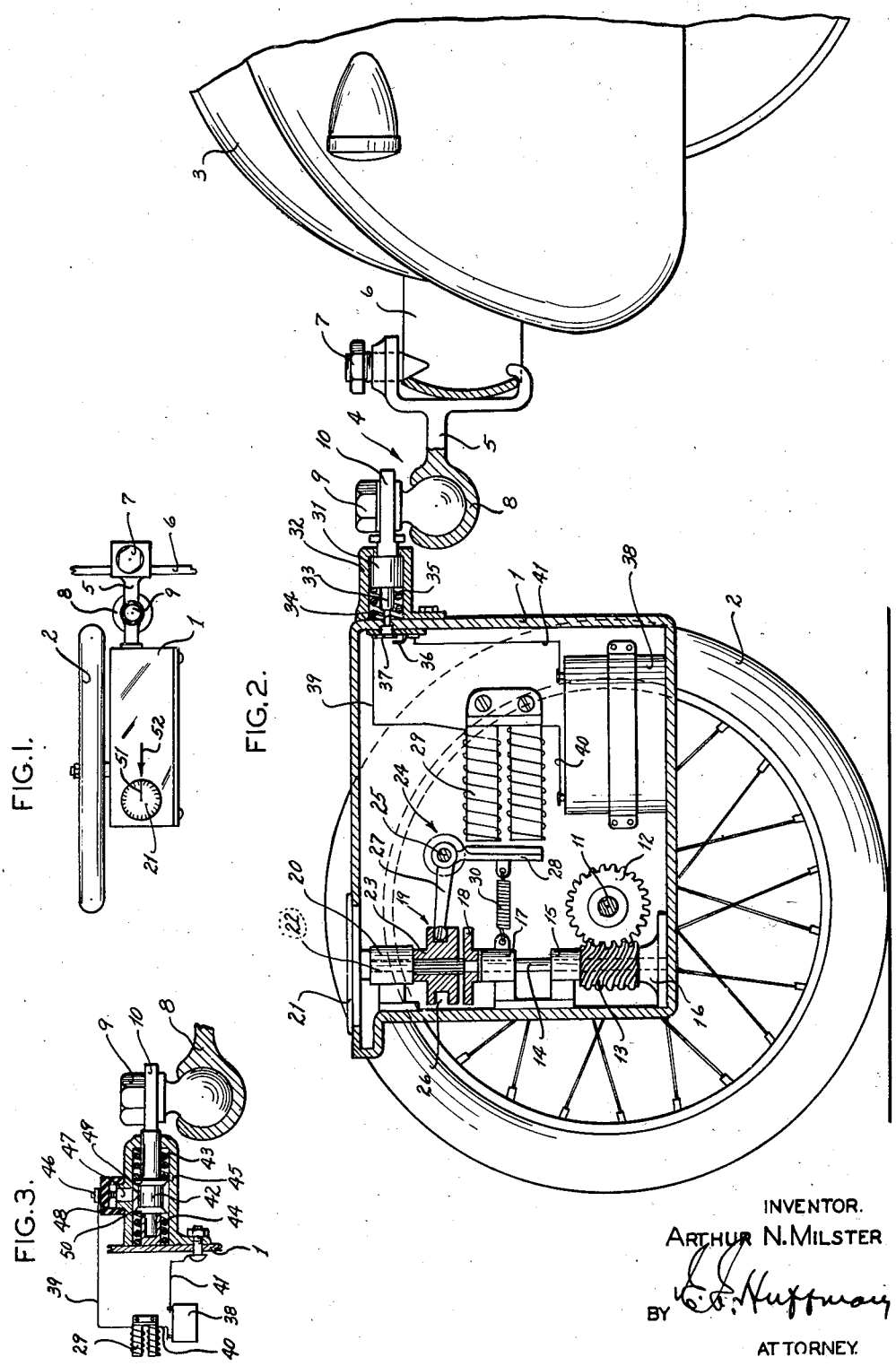
INVENTOR.
ARTHUR N. MILSTER
BY
ATTORNEY.

Patented June 7, 1949

2,472,541

UNITED STATES PATENT OFFICE 2,472,541

BRAKE TESTING DEVICE

Arthur N. Milster, Ferguson, Mo., assignor to Wagner Electric Corporation, St. Louis, Mo., a corporation of Delaware Application December 16, 1944, Serial No. 568,532

6 Claims. (Cl. 73—128)

This invention relates to devices for measuring the stopping distances of moving vehicles or bodies and in its more specific aspects is directed to a mechanism whereby the measurements are made in a self-contained unit.

One of the objects of the invention is to provide a device for making measurements relative to the stopping distances of moving bodies in a self-contained measuring instrument.

Another object of the invention is to provide a distance measuring and stopmeter device which is made operable by merely securing it to the vehicle or moving body to be tested.

A further object of the invention is to provide a distance measuring instrument to determine the stopping distance of a moving vehicle in which an inertia-operated switch is provided for controlling the transmission mechanism of the stopmeter.

Another and still further object of the invention is to provide a stopmeter which is capable of measuring the acceleration of deceleration distances of a moving body.

Still another object of the invention is to provide a self-contained stopmeter capable of accurately measuring the deceleration and acceleration distances of a moving body which requires no physical connection with the moving body being tested other than the means for attaching the same thereto.

Another object of the invention is to provide a stopmeter whose operative mechanism is controlled by an inertia switch which becomes operative at the instant deceleration begins to take place or at which acceleration ceases.

Other and further objects of the invention will occur to those skilled in the arts to which this application pertains as the description proceeds, which, taken in connection with the accompanying drawings, sets forth a preferred embodiment of the invention and selected modifications thereof but such disclosures are not to be construed as a limitation of the invention which is limited only by the appended claims and any and all modifications, alterations and variations of structure coming within the spirit and scope thereof are deemed to be included herein.

In the drawings:

Figure 1 is a plan view of the stopmeter;

Figure 2 is an enlarged elevational view with parts in section to show the details of construction; and Figure 3 shows a modified inertia switch construction.

Various devices have been developed in the arts for measuring the distance or time required to stop a vehicle in order to determine the efficiency of the braking system which is provided on the vehicle. These devices have been of various types, some of the conventional decelerometer type long known in the automotive industry and others of the fifth wheel type in which the energization of the operative mechanism in the stopmeter is controlled by the switch or other mechanism directly associatd with the brake mechanism of the vehicle or moving body whose braking efficiency is to be determined. Each of these devices has its respective disadvantages in that the decelerometer is intended to measure the average distances only and the other devices mentioned require a physical connection with some part of the operating mechanism of the vehicle or body which is to be the subject of the test. The instant invention overcomes the disadvantages inherent in the prior art constructions and provides a self-contained unit securable to a vehicle or body under test and which requires no other attention than that of mechanically securing it to the vehicle to be tested.

The objects and advantages of the instant invention set forth above are obtained in the mechanism shown in the several drawings in which 1 is a housing supported on a wheel 2 connectable to a vehicle 3 by means of a suitable trailer hitch 4. The hitch comprises a bracket 5 securable to the rear bumper 6 of a vehicle by means of a tapered screw 7. The bracket 5 is provided with a socket 8 receiving a spherical headed bolt 9 to which the hitch element 10 of the trailer unit is secured.

The housing 1 encloses the operative mechanism supported by wheel 2 mounted on wheel axle 11 having a gear 12 secured thereto meshing with the worm 13. The gears 12 and 13 are preferably of the hypoid type in order to secure a positive operation of the mechanism although other types of transmitting devices may be equally suitable for the device. The wheel 2 is preferably of the bicycle type and while only one is shown in the particular disclosure for the purpose of simplicity, an additional wheel may be employed to aid in supporting the housing 1 and associated mechanism. Gear 13 is mounted on a vertical shaft 14 rotatable in bearings 15 and 16 and extends upwardly into the housing through an additional bearing 17. Above bearing 17 there is the driving portion 18 of a clutch 19. A second shaft 22 is journaled in a bearing 20 axially disposed with respect to shaft 14 and at the upper end of this shaft a gage disc or dial 21 is fixed rotatable with respect to housing 1. Shaft 22, which has disc 21 mounted thereon at its upper end, has a cooperating or driven element 23 of the clutch splined thereon for selective engagement with the driving portion 18.

A modified bell-crank 24 is pivotally mounted on one wall of housing 1 by means of pin 25, one arm 27 of the bell-crank element cooperating with a groove 26 in driven portion 23 of clutch 19 by means of a suitable ball connection. The other side of the bell-crank comprises an arm 28 disposed opposite an electro-magnet 29. Spring 30 is connected between an eyed boss on the bearing 17 and an eyed boss on arm 28 to hold the clutch element 23 in disengaged position.

The hitch element 10 is provided with an enlargement 31 arranged within a housing 32 secured to the main housing 1 by means of appropriate screw means. The housing 32 is bored to receive the enlargement 31 so as to freely slide with respect thereto. The element 10 has an extension 33 beyond the enlargement 31 with a further extension 34 functioning as a contact engaging element. A spring 35 surrounding extensions 33 and 34 is disposed between the enlargement 31 and housing 1 in order to cause said enlargement 31 to urge same to the right against the closed end of housing 32. Arranged within housing 1 is a fixed contact 36 and a movable contact 37 is arranged opposite thereto which is engageable by the portion 34 upon deceleration of the vehicle to urge it into contact with fixed contact 36. The switch elements are suitably insulated from housing 1 in a conventional manner. A source of electrical energy, preferably a battery 38, is mounted in housing 1 and suitable leads 39, 40 and 41 connect the contact elements 36 and 37 constituting a switch, electro-magnet 29 and battery 38 in series.

A modified construction adapted for measuring both acceleration and deceleration distances of a moving vehicle is shown in Figure 3. The socket portion of the hitch is disclosed together with the spherical headed bolt and nut assembly 9 with the hitch element 10 to show the manner of connection to the vehicle or moving body whose rate of change of speed is to be tested. A portion of one wall of housing 1 is shown to indicate the manner of mounting on said housing. The hitch element 10 has a spool 42 replacing element 31 secured thereto on opposite sides of which springs 43 and 44 are arranged in housing 45 as shown. The object of these springs is to maintain the spool in substantially the middle of housing 45 in which element 10 and spool 42 are received. Contacts 46 and 47 are arranged in a separate retainer 48 and boss portion on housing 45. A movable contact element 47 is slidably received in a bore in the boss and a fixed contact element 46 is arranged in the retainer or housing 48. The spool 42 has conical portions 49 and 50 thereon which, upon suitable selective movement of housing 1 with respect to the hitch socket portion 8, move contact 47 into engagement with the fixed contact 46 to thereby close the circuit to the electro-magnet 29 and battery 38, contacts 46 and 47 constituting a switch.

The operation of the device depends upon the relative movement that takes place between the trailer unit and the vehicle when decelerated in order to close the contacts 36 and 37 of the inertia switch. When the vehicle 3 has been brought up to a proper speed from which deceleration distances are to be measured, it will immediately slow down upon the application of the brakes and since there is no braking applied to the trailer unit other than through the brakes on the towing vehicle, the trailer will be urged forwardly relatively to vehicle 3 such that the enlargement 31 will move rearwardly in housing 32, thereby bringing switch contacts 36 and 37 into engagement by the action of part 34 against the movable switch contact element 37. The closure of the switch will immediately close the circuit for the electro-magnet 29 energizing same and rotating the bell-crank 24 on pin 25 in a counterclockwise direction, as viewed in Figure 2, against the tension of spring 30 to thereby bring the clutch portions 18 and 23 into engagement by axially moving portion 23 on the splined portion of shaft 22. The closure of the switch will immediately initiate rotation in the graduated disc 21 which has the zero position thereon indicated by line 51 set opposite arrow 52 as shown in Figure 1. The disc 21 is graduated in terms of lineal feet of stopping distances and the diameter of wheel 2 and the ratio of gears 12 and 13 is such that the graduations on gage 21 will provide a direct lineal foot reading. The circuit for the electro-magnet 29 will remain closed until such time as the trailer is brought to rest whereupon the contact elements 36 and 37 will be separated under the action of spring 35 moving the trailer unit and vehicle 3 relatively to each other and the stopmeter can then be prepared for another test run after the reading is taken. Each stop that is made requires the operator to make note of the reading of the meter because any further motion of the towing vehicle 3 may give an erroneous indication of the stopping distance of the vehicle.

It may be desirable at times to know the distance necessary to accelerate a vehicle or moving body from zero speed to any predetermined speed. In the device shown in Figure 2 it is only possible to measure the stopping distance and Figure 3 discloses a device in which not only the distance to decelerate a vehicle can be measured but also the accelerating distance may be measured therewith. In Figure 2 during acceleration and any other normal operation, the enlargement 31 is normally in engagement with the right-hand end of housing 32 but in Figure 3 the spool 42 on element 10 is maintained in a central position by means of springs 43 and 44. When an acceleration distance is to be measured, spring 43 will be compressed such that contact 47 will be moved vertically into engagement with fixed contact 46 by the action of conical element 50 thereagainst. The circuit in Figure 3 includes a part of the housing since lead 41 is connected to one of the spool elements through housing 45 by means of one of the retaining elements for securing housing 45 to housing 1. When the vehicle 3 commences forward motion, the conical element 50 will force the engagement of contacts 46 and 47 to close the electro-magnetic circuit as previously indicated, thereby setting in motion disc 21 through the means of clutch 23. When the vehicle ceases acceleration, spring 43 will urge the trailer vehicle forwardly such that contacts 46 and 47 will be disengaged, thereby opening the electro-magnetic circuit and stopping rotation of disc 21 and enabling a reading thereof to determine the acceleration distance. It is obvious in this instance that a towing vehicle must be slowed down very gradually so as to prevent the conical element 49 from closing the circuit when decelerated. When measuring the decelerating or stopping distance with the disclosure in Figure 3, the reverse movements described for acceleration apply and it then functions identically as the disclosure in Figure 2.

The instant disclosure shows a mechanism for measuring lineal distances but the exact type of measuring device is not material to the performance of the device because other types of indicating or measuring devices or combinations thereof is contemplated within the purview hereof.

Having fully described my invention, that which I claim as novel and desire to protect by Letters Patent of the United States is:

1. In a brake testing device, a wheel supported trailer adapted to be connected to a towing vehicle; means for connecting the trailer to the towing vehicle which includes a part securable to the towing vehicle and a part secured to said trailer, said parts being longitudinally movable relative to each other along the line of motion of the vehicle and trailer in response to vehicle deceleration; flexible means in said connecting means for reversely moving said trailer relative to said towing vehicle; a dial mounted in said trailer; means for rotating said dial from the trailer wheel; a clutch in said means; means for operating said clutch; and means operable by the relative longitudinal movement of said trailer and said towing vehicle through the medium of said flexible means for controlling the operation of said dial rotating means.

2. In a brake testing device, a wheel supported trailer adapted to be connected to a towing vehicle; means for connecting the trailer to the towing vehicle which includes a tubular member secured to said trailer and a part securable to the towing vehicle longitudinally movable in said tubular member when said trailer moves relative to said towing vehicle along the line of trailer travel and in response to vehicle deceleration; a dial in said trailer; means for rotating said dial from said trailer wheel; and means operable by relative longitudinal movement of the parts of said connecting means for controlling said dial rotating means.

3. In a brake testing device, a wheel supported trailer; means for connecting said trailer to a towing vehicle which includes a tubular member secured to said trailer and a part securable to said towing vehicle longitudinally movable in said tubular member when said trailer moves relative to said towing vehicle along the line of trailer travel in response to vehicle deceleration; a dial in said trailer; means for rotating said dial from the supporting wheel on said trailer; an electromagnetic clutch in said means; an electrical circuit for said electromagnetic clutch; and a switch in said electrical circuit operable by relative longitudinal movement of the parts of said connecting means for controlling the operation of said clutch.

4. In a brake testing device, a wheel supported trailer; means for connecting said trailer to a towing vehicle which consists of two members one of which is longitudinally extended and the other longitudinally movable relative to the other and in response to vehicle deceleration, one of said members being secured to said trailer and the other member securable to the towing vehicle; a dial in said trailer; means for rotating said dial in response to rotation of the trailer wheel; an electromagnetically operated clutch in said dial rotating means; an electrical circuit for the control of said electromagnetically operated clutch; and a switch located in said electrical circuit operable by the longitudinal movement of said trailer relative to the towing vehicle for controlling the operation of said clutch.

5. In a brake testing device, a trailer having a wheel thereon for supporting the trailer; means for connecting said trailer to a towing vehicle which includes a part secured to said trailer and a part securable to the towing vehicle and movable relative to each other when said trailer and towing vehicle move relatively longitudinally with respect to each other in response to vehicle deceleration and in the line of travel of the trailer; a dial in said trailer; means for rotating said dial from said supporting wheel; an electromagnetic clutch in said means; an electrical circuit for said electromagnetic clutch; a switch in said circuit actuated by relative longitudinal motion between the trailer and the towing vehicle in one direction of travel for causing the parts of said connecting means to move relative to each other for closing said switch, thereby controlling the engagement of said electromagnetic clutch; and means for moving said towing vehicle longitudinally relative to said trailer and along the line of trailer motion for opening said switch, thereby opening said circuit and deneregizing said electromagnet.

6. In a brake testing device for measuring acceleration and deceleration distances of a towing vehicle; a wheel supported trailer; means for connecting said trailer to a towing vehicle which comprises a hitch consisting of two members one of which is secured to the trailer and the other securable to the towing vehicle, said members being slidably movable relative to each other when the towing vehicle is accelerating or decelerating; a dial in said trailer; means for rotating said dial from the wheel; a clutch in said means; an electromagnet for operating said clutch; an electrical circuit for said electromagnet; a switch closed by the relative movement of said members upon deceleration or acceleration of the vehicle; and means to open said switch after acceleration or deceleration of the vehicle ceases.

ARTHUR N. MILSTER.

REFERENCES CITED

The following references are of record in the file of this patent:

UNITED STATES PATENTS

| Number | Name | Date |
|---|---|---|
| 1,165,592 | Hall et al. | Dec. 28, 1915 |
| 1,414,910 | Watson | May 2, 1922 |
| 1,414,920 | Anderson | May 2, 1922 |
| 1,950,583 | Watkins | Mar. 13, 1934 |
| 2,279,409 | Milster et al. | Apr. 14, 1942 |
| 2,298,065 | Meshberg | Oct. 6, 1942 |
| 2,305,789 | Kempf | Dec. 22, 1942 |
| 2,325,910 | Hetzel | Aug. 3, 1943 |
| 2,370,141 | Brunner | Feb. 27, 1945 |

FOREIGN PATENTS

| Number | Country | Date |
|---|---|---|
| 637,699 | Germany | Nov. 2, 1936 |